United States Patent
Toda et al.

(10) Patent No.: US 11,366,235 B2
(45) Date of Patent: Jun. 21, 2022

(54) POSITIONING DEVICE, POSITIONING SYSTEM, POSITIONING METHOD AND POSITIONING PROGRAM

(71) Applicant: Furuno Electric Co., Ltd., Hyogo (JP)

(72) Inventors: Hiroyuki Toda, Nishinomiya (JP); Naomi Fujisawa, Nishinomiya (JP); Hiraku Nakamura, Osaka (JP)

(73) Assignee: FURUNO ELECTRIC CO., LTD., Nishinomiya (JP)

( * ) Notice: Subject to any disclaimer, the term of this patent is extended or adjusted under 35 U.S.C. 154(b) by 290 days.

(21) Appl. No.: 16/606,772

(22) PCT Filed: Mar. 27, 2018

(86) PCT No.: PCT/JP2018/012369
§ 371 (c)(1),
(2) Date: Oct. 21, 2019

(87) PCT Pub. No.: WO2018/198641
PCT Pub. Date: Nov. 1, 2018

(65) Prior Publication Data
US 2020/0132862 A1    Apr. 30, 2020

(30) Foreign Application Priority Data

Apr. 28, 2017 (JP) .............................. JP2017-089603

(51) Int. Cl.
*G01S 19/44* (2010.01)
*G01S 19/51* (2010.01)
(Continued)

(52) U.S. Cl.
CPC .............. *G01S 19/44* (2013.01); *G01S 19/46* (2013.01); *G01S 19/47* (2013.01); *G01S 19/51* (2013.01)

(58) Field of Classification Search
CPC .......... G01S 19/44; G01S 19/46; G01S 19/47; G01S 19/51
See application file for complete search history.

(56) References Cited

U.S. PATENT DOCUMENTS 6,259,398 B1   7/2001  Riley
8,120,527 B2   2/2012  Ashjaee
(Continued)

FOREIGN PATENT DOCUMENTS

JP    2001-281317 A    10/2001
JP    2002-40124 A     2/2002
(Continued)

OTHER PUBLICATIONS

International Search Report and Written Opinion dated Jun. 19, 2018 for PCT/JP2018/012369 filed on Mar. 27, 2018, 9 pages including English Translation of the International Search Report.

*Primary Examiner* — Dao L Phan
(74) *Attorney, Agent, or Firm* — Xsensus LLP

(57) ABSTRACT

The determination of an integer value bias may be performed at high speed. A positioning device, may include a FLOAT solution calculating part and an integer value bias determining part. The FLOAT solution calculating part may use carrier phase differences between carrier phases obtained by a plurality of antennas of a first station and a carrier phase obtained by one or more antennas of a second station provided separately from the first station to calculate a FLOAT solution of a particular position that is a relative position with respect to the second station, without using posture information on the first station. The integer value bias determining part may determine an integer value bias of the carrier phase difference, using the FLOAT solution of the particular position and the posture information on the first station.

10 Claims, 11 Drawing Sheets

(51) Int. Cl.
  *G01S 19/46* (2010.01)
  *G01S 19/47* (2010.01)

(56) References Cited

U.S. PATENT DOCUMENTS

| | | |
|---|---|---|
| 9,035,826 B2 | 5/2015 | Ashjaee |
| 2011/0187590 A1* | 8/2011 | Leandro ................. G01S 19/40 |
| | | 342/357.27 |

FOREIGN PATENT DOCUMENTS

| | | |
|---|---|---|
| JP | 2007-71868 A | 3/2007 |
| JP | 2007-101484 A | 4/2007 |
| JP | 2010-197353 A | 9/2010 |
| JP | 2013-228237 A | 11/2013 |

\* cited by examiner

POSITIONING DEVICE, POSITIONING SYSTEM, POSITIONING METHOD AND POSITIONING PROGRAM

CROSS-REFERENCE TO RELATED APPLICATIONS

The present application is based on PCT filing PCT/JP2018/012369, filed Mar. 27, 2018, which claims priority to JP 2017-089603, filed Apr. 28, 2017, the entire contents of each are incorporated herein by reference.

TECHNICAL FIELD

The present disclosure relates to a positioning device, a positioning system, a positioning method, and a positioning program, which perform positioning by using the carrier phases of positioning signals.

BACKGROUND ART

Conventionally, differential or relative positioning is used as a highly-precise positioning method. The relative positioning performs the positioning using the carrier phase differences of the positioning signals received by a plurality of antennas. As a kind of such a relative positioning, RTK (Real-Time Kinematic) has been put in practical use.

Generally, for RTK, although one antenna is used for each of a base station and a mobile station, Patent Documents 1 and 2 disclose that a plurality of antennas are used for RTK.

In the relative positioning device of Patent Documents 1 and 2, at least two or more antennas (reference station antennas) are allocated at the reference station, and at least three or more antennas (mobile station antenna) at the mobile station. The relative positioning device of Patent Documents 1 and 2 carry out the positioning of the position of a particular mobile station antenna or the position of the mobile station using the position of each mobile station antenna to the respective reference station antennas.

REFERENCE DOCUMENTS OF CONVENTIONAL ART

Patent Documents

Patent Document 1: U.S. Pat. No. 8,120,527B2
Patent Document 2: U.S. Pat. No. 9,035,826B2

DESCRIPTION OF THE DISCLOSURE

Problems to be Solved by the Disclosure

However, in the method of using the plurality of reference station antennas and the plurality of mobile station antennas disclosed in Patent Documents 1 and 2, the determination of an initial integer value bias which is essential for the relative positioning calculation by the carrier phase difference may take time. If the determination of the initial integer value bias takes time, the positioning also takes time.

Therefore, one purpose of the present disclosure is to determine an integer value bias at high speed.

Summary of the Disclosure

A positioning device according to one aspect of the present disclosure may include processing circuitry. The processing circuitry may use carrier phase differences between carrier phases obtained by a plurality of antennas of a first station and a carrier phase obtained by one or more antennas of a second station provided separately from the first station to calculate a FLOAT solution of a particular position that is a relative position with respect to the second station, without using posture information on the first station, may acquire the posture information on the first station, and may determine an integer value bias of the carrier phase, using the FLOAT solution of the particular position and the posture information on the first station.

Moreover, a positioning device according to another aspect of the present disclosure may include processing circuitry. The processing circuitry may calculate a FLOAT solution of a particular position that is an absolute position of a first station, using carrier phases obtained by a plurality of antennas of the first station, without using posture information on the first station, may acquire the posture information on the first station, may determine an integer value bias of the carrier phase, using the FLOAT solution of the particular position and the posture information on the first station.

According to these configurations, even if the relative spatial relationship between the plurality of antennas of the first station (i.e., the attitude angle of the first station) is not known, the FLOAT solution may be calculated. Here, the characteristic of the carrier phase differences being an integer is not required. Therefore, the FLOAT solution converged more securely can be obtained even if the relative spatial relationship is not known.

Effect of the Disclosure

According to the present disclosure, the initial integer value bias can be determined at high speed, and the relative positioning using the carrier phase difference can be accelerated.

MODES FOR CARRYING OUT THE DISCLOSURE

Figure 1:
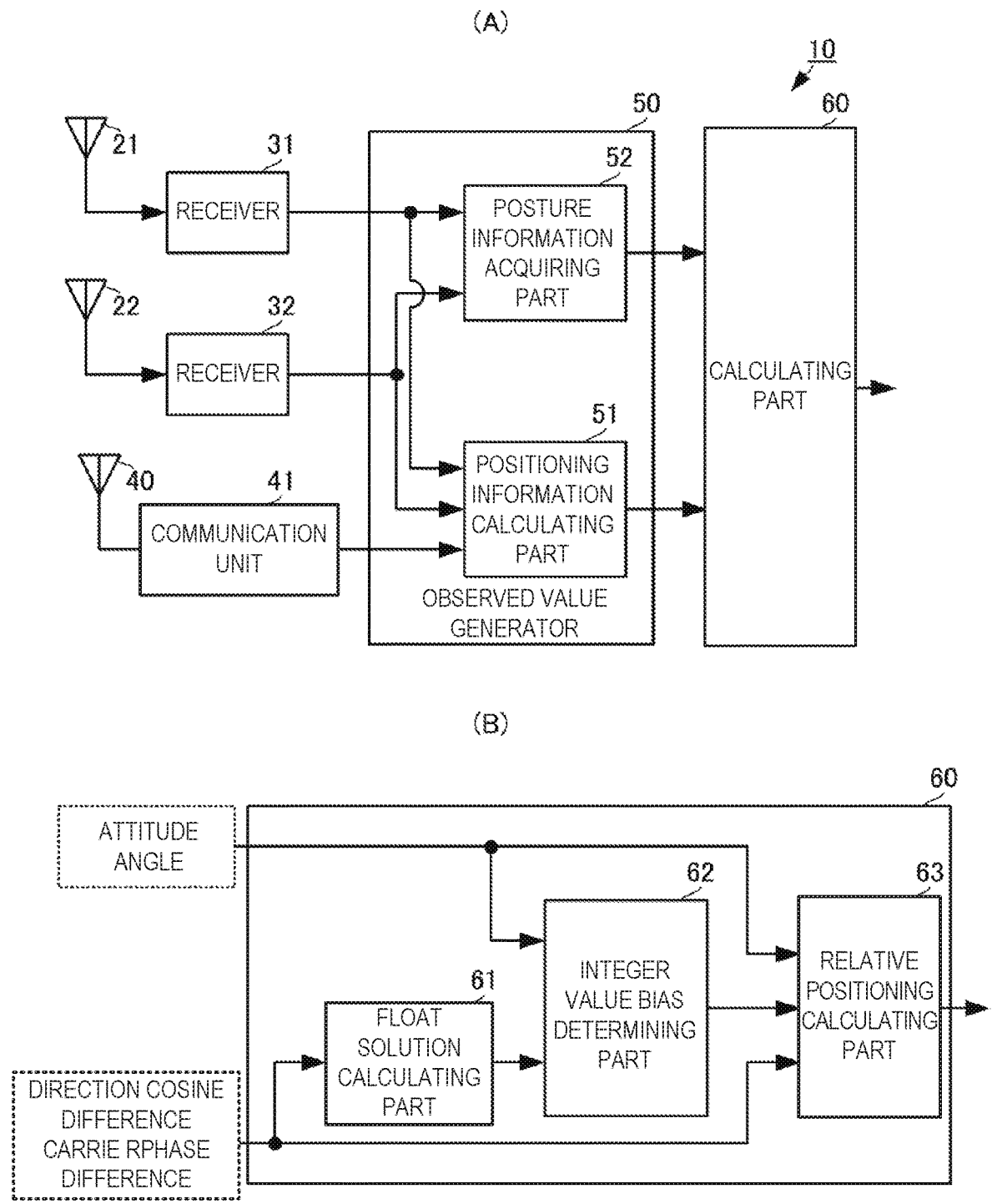
FIG. 1(A) is a functional block diagram of a relative positioning device according to a first embodiment of the present disclosure.
FIG. 1(B) is a functional block diagram of a calculating part illustrated in FIG. 1(A).
Figure 2:
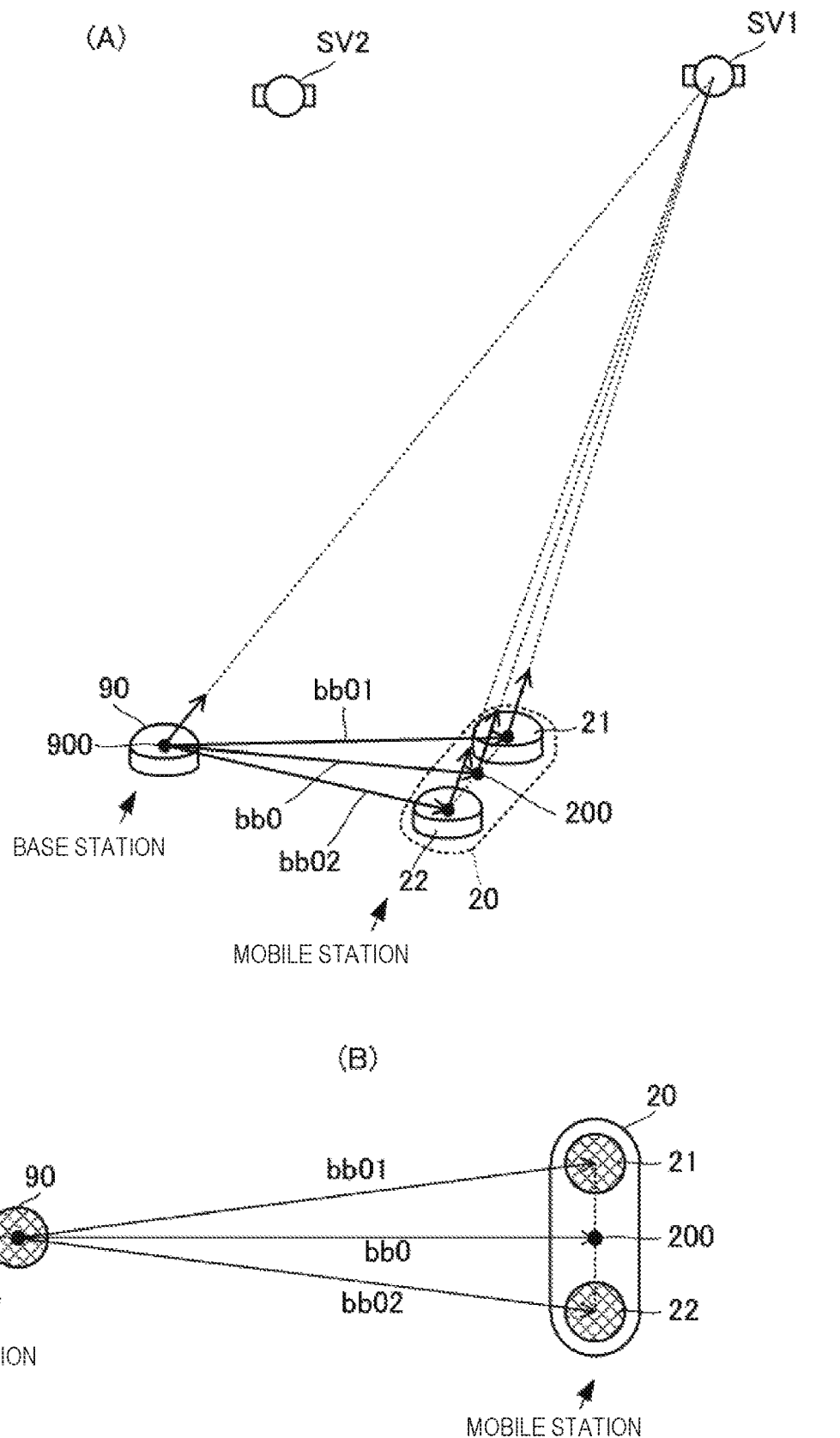
FIG. 2(A) is a view illustrating one example of a spatial relationship between a plurality of antennas in a relative positioning system including the relative positioning device according to the first embodiment of the present disclosure, and a plurality of positioning satellites.
FIG. 2(B) is a view illustrating base-line vectors in the relative positioning system including the relative positioning device according to the first embodiment of the present disclosure.

A relative positioning device, a relative positioning system, a relative positioning method, and a relative positioning program according to a first embodiment of the present disclosure are described with reference to the drawings. FIG. 1(A) is a functional block diagram of the relative positioning device according to the first embodiment of the present disclosure. FIG. 1(B) is a functional block diagram of a calculating part illustrated in FIG. 1(A). FIG. 2(A) is a view illustrating one example of a spatial relationship between a plurality of antennas in the relative positioning system including the relative positioning device according to the first embodiment of the present disclosure, and a plurality of positioning satellites. Note that, in FIG. 2(A), illustration of broken lines indicative of carrier phases to a positioning satellite SV2 is omitted. FIG. 2(B) is a view illustrating base-line vectors in the relative positioning system including the relative positioning device according to the first embodiment of the present disclosure.

As illustrated in FIG. 1(A), a positioning device 10 may include positioning antennas 21 and 22, receivers 31 and 32, a wireless communication antenna 40, a communication unit 41, an observed value generator 50, and a calculating part 60 (which is also referred to as processing circuitry). As illustrated in FIG. 1(B), the calculating part 60 may include a FLOAT solution calculating part 61, an integer value bias determining part 62, and a relative positioning calculating part 63. The receivers 31 and 32, the communication unit 41, the observed value generator 50, and the calculating part 60 may be respectively implemented by discrete hardware and a processing program for each part executed by the hardware.

The positioning device 10 may be used as a mobile station of the relative positioning system. The relative positioning system may be provided with a base station apart from the mobile station. The mobile station is a "first station" of the present disclosure, and the base station is a "second station" of the present disclosure. For example, a RTK (Real-Time Kinematic) system may be adopted as the relative positioning system, and the positioning device 10 may use this RTK system to perform the relative positioning.

As illustrated in FIGS. 2(A) and 2(B), the positioning antennas 21 and 22 may be disposed in a given spatial relationship. The positioning antenna 21 may receive positioning signals from the positioning satellites SV1 and SV2, and output them to the receiver 31. The positioning antenna 22 may receive positioning signals from the positioning satellites SV1 and SV2, and output them to the receiver 32. The positioning antennas 21 and 22 may receive the positioning signals from a plurality of positioning satellites including the positioning satellites SV1 and SV2. Here, the positioning antennas 21 and 22 may receive the positioning signals from at least four common positioning satellites. Note that the base station may be provided with a positioning antenna 90. The positioning antenna 90 of the base station may also receive the positioning signals from at least four common positioning satellites with the positioning antennas 21 and 22.

The receiver 31 may detect a carrier phase of each of a plurality of positioning signals received by the antenna 21, and output it to the observed value generator 50. Here, the receiver 31 may detect a code pseudo range of each of the plurality of positioning signals received by the antenna 21, and output it together with the carrier phase. Further, the receiver 31 may output an independent positioning result (position coordinate) calculated using the code pseudo ranges together with the carrier phases. Note that the receiver 31 may output the detection results of the code pseudo range, or the calculation results of the independent positioning result.

The receiver 32 may detect to the carrier phase of each of the plurality of positioning signals received by the antenna 22, and output it to the observed value generator 50. Here, the receiver 32 may detect the code pseudo range of each of the plurality of positioning signals received by the antenna 22, and output it together with the carrier phase. Further, the receiver 32 may output an independent positioning result (position coordinate) calculated using the code pseudo ranges together with the carrier phases. Note that the receiver 32 may output the detection results of the code pseudo range, or the calculation results of the independent positioning result.

The wireless communication antenna 40 may receive a positioning data signal from the base station. The positioning data signal may include the carrier phase and the position coordinate at the antenna 90 of the base station. Note that, if the base station is a movable station, the independent positioning result at the base station may be used as the position coordinate.

The communication unit 41 may demodulate to the positioning data signal received by the wireless communication antenna 40, and output the carrier phase and the position coordinate at the antenna 90 of the base station to the observed value generator 50.

The observed value generator 50 may include a positioning information calculating part 51 and a posture (attitude) information acquiring part 52.

The positioning information calculating part 51 may calculate a double phase difference corresponding to a pair of the antenna 21 and the antenna 90 for every group of positioning satellites using the carrier phase of the antenna 21 and the carrier phase of the antenna 90. That is, the positioning information calculating part 51 may calculate the double phase difference corresponding to a base-line vector bb01 which starts from a center point 900 of the antenna 90 and ends at the antenna 21, as illustrated in FIGS. 2(A) and 2(B). Moreover, the positioning information calculating part 51 may calculate a double phase difference corresponding to a pair of the antenna 22 and the antenna 90 for every group of positioning satellites using the carrier phase of the antenna 22 and the carrier phase of the antenna 90. That is, the positioning information calculating part 51 may calculate the double phase difference corresponding to a base-line vector bb02 which starts from the center point 900 of the antenna 90 and ends at the antenna 22, as illustrated in FIGS. 2(A) and 2(B). The positioning information calculating part 51 may output the double phase differences to the calculating part 60.

Moreover, the posture information acquiring part 52 may calculate a relative spatial relationship between the antenna 21 and the antenna 22 (i.e., an attitude angle) based on the carrier phase difference between the antennas 21 and 22 by using a known method. The posture information acquiring part 52 may output the attitude angle to the calculating part 60.

Here, the calculation of the attitude angle may be more complicated than the calculation of the double phase difference, and therefore it may require more time than the calculation of the double phase difference. Therefore, a timing at which the attitude angle is outputted after it is calculated from the carrier phases at a certain timing may be later than a timing at which the double phase difference is outputted after it is calculated from the carrier phase at the same timing.

The observed value generator 50 may associate each of the double phase difference and the attitude angle with information from which a received timing of the original carrier phase is known, and output them to the calculating part 60. Moreover, the observed value generator 50 may associate the independent positioning result of the antenna 21 described above and the independent positioning result of the antenna 22 described above with the information from which the received timing of the original carrier phase is known, and output them to the calculating part 60.

The calculating part 60 may execute a relative positioning calculation for a particular position 200 of an antenna device 20 by using the double phase difference of the antenna 21 and the antenna 90, the double phase difference of the antenna 22 and the antenna 90, the independent positioning results of the antennas 21 and 22, and the attitude angle of the antenna 21 and the antenna 22. The particular position 200 may be a midpoint position between the position of the antenna 21 and the position of the antenna 22 when the antenna device 20 is seen in a plan view. Note that the particular position 200 is not limited to this configuration, and it may be a position calculable based on a weighted average of the position of the antenna 22 and the position of the antenna 21 in the antenna device 20.

In more detail, as illustrated in FIG. 1(B), the FLOAT solution calculating part 61 of the calculating part 60 may calculate the position coordinate of the particular position 200 and a FLOAT solution of an integer value bias by using the double phase difference between the antenna 21 and the antenna 90, the double phase difference of the carrier phases between the antenna 22 and the antenna 90, and the independent positioning results of the antennas 21 and 22.

Here, the double phase difference of the antenna 90 and the antenna 21 may be $\nabla\Delta\Phi 91$, and the double phase difference of the antenna 90 and the antenna 22 may be $\nabla\Delta\Phi 92$. Moreover, the position of the antenna 21 by the independent positioning may be b1, and the position of the antenna 22 by the independent positioning may be b2. Note that the positions b1 and b2 may be relative positions when the center point 900 of the antenna 90 is used as a reference point. Moreover, a direction cosine difference matrix may be $\Delta H$. The direction cosine difference matrix $\Delta H$ may be calculated by a known method based on the positions of the antennas 21 and 22 by the independent positioning, the position of the antenna 90, and the position of the positioning satellites SV1 and SV2. Note that since the distances between the antenna 90 and the antennas 21 and 22 are short enough as compared with the distance between the antenna 90 and the antennas 21 and 22, and the positioning satellites SV1 and SV2, the direction cosine difference matrix for the antenna 21 and the direction cosine difference matrix for the antenna 22 may be the same matrix.

In this case, the following expression can be established for the base-line vector bb01 connecting the antenna 90 and the antenna 21.

$$\nabla\Delta\Phi 91 = \Delta H \cdot b1 + \lambda \cdot \nabla\Delta N1 \qquad \text{(Formula 1)}$$

In Formula 1, $\lambda$ may be a wavelength of the carrier wave, and $\Pi\Delta N1$ may be an integer value bias for the base-line vector bb01, i.e., an integer value bias for the pair of the antenna 90 and the antenna 21.

Similarly, the following expression can be established for the base-line vector bb02 connecting the antenna 90 and the antenna 22.

$$\nabla\Delta\Phi 92 = \Delta H \cdot b2 + \lambda \cdot \nabla\Delta N2 \qquad \text{(Formula 2)}$$

In Formula 2, $\lambda$ may be a wavelength of the carrier wave, and $\nabla\Delta N2$ may be an integer value bias for the base-line vector bb02, i.e., an integer value bias for the pair of the antenna 90 and the antenna 22.

Here, as described above, the particular position 200 of the antenna device 20 may be the midpoint of the position of the antenna 21 and the position of the antenna 22. Therefore, a position b0 of the particular position 200 on the basis of the center point 900 of the antenna 90 may be defined by the following formula.

$$b0 = (b1+b2)/2 \qquad \text{(Formula 3)}$$

Moreover, an integer value bias a0 for a base-line vector bb0 connecting the center point 900 of the antenna 90 and the particular position 200 of the antenna device 20 may be defined by the following formula.

$$a0 = (\nabla\Delta N1 + \nabla\Delta N2)/2 \qquad \text{(Formula 4)}$$

Therefore, the following formula can be established from Formula 1, Formula 2, Formula 3, and Formula 4.

$$(\nabla\Delta\Phi 91 + \nabla\Phi 92)/2 = \Delta H \cdot b0 + a0 \qquad \text{(Formula 5)}$$

By applying a Kalman filter to this formula, a FLOAT solution of the position b0 of the particular position 200 and a FLOAT solution of the integer value bias a0 may be estimated. Note that the estimation technique may not be limited to the Kalman filter, but other estimation techniques may also be used.

Here, the FLOAT solution of the integer value bias a0 is not limited to be an integer. Therefore, even if the relative spatial relationship between the antenna 21 and the antenna 22 (i.e., the attitude angle) is not known, each FLOAT solution (the FLOAT solution of the position b0 of the particular position 200 and the FLOAT solution of the integer value bias a0) can be converged more securely to a more accurate value. In addition, since the attitude angle is not needed, the estimation of the FLOAT solution may become high-speed.

The integer value bias determining part 62 of the calculating part 60 may determine integer value biases $\nabla\Delta N1$ and $\nabla\Delta N2$ using the attitude angle from the posture information acquiring part 52, the FLOAT solution b0 described above, and the respective double phase differences $\nabla\Delta\Phi 91$ and $\nabla\Delta\Phi 92$.

Here, the relative position of the antenna 22 on the basis of the antenna 21 in a body coordinate system may be $\Delta Lb$, and the relative position of the antenna 22 on the basis of the antenna 21 in a navigation coordinate system may be $\Delta Ln$.

Moreover, a coordinate conversion matrix from the body coordinate system to the navigation coordinate system may be Cnb.

In this case, the following formula can be established.

$$\Delta Ln = Cnb \cdot \Delta Lb \qquad \text{(Formula 6)}$$

The following formula can be established from Formulas 1 and 6.

$$\nabla\Delta\Phi 91 = \Delta H \cdot (b0 - \Delta Ln/2) + \lambda \cdot \nabla\Delta N1 \qquad \text{(Formula 7)}$$

$\nabla\Delta N1$ may be an integer bias for the pair of the antenna 90 and the antenna 21.

When converting Formula 7, it becomes Formula 8.

$$\nabla\Delta\Phi 91 + \Delta H \cdot \Delta Ln/2 = \Delta H \cdot b0 \lambda \cdot \nabla\Delta N1 \qquad \text{(Formula 8)}$$

Moreover, the following formula can be established from Formulas 2 and 6.

$$\nabla\Delta\Phi 92 = \Delta H \cdot (b0 + \Delta Ln/2) + \lambda \cdot \nabla\Delta N2 \qquad \text{(Formula 9)}$$

$\nabla\Delta N2$ may be an integer bias for the pair of the antenna 90 and the antenna 22.

When converting Formula 9, it becomes Formula 10.

$$\nabla\Delta\chi 92 - \Delta H \cdot \Delta Ln/2 = \Delta H \cdot b0 + \lambda \cdot \nabla\Delta N2 \qquad \text{(Formula 10)}$$

The integer value bias determining part 62 of the calculating part 60 may determine the integer value biases $\nabla\Delta N1$ and $\nabla\Delta N2$ by a known method using the LAMBDA method to Formulas 8 and 10. That is, the integer value bias determining part 62 of the calculating part 60 may calculate FIX solutions of the integer value biases $\nabla\Delta N1$ and $\nabla\Delta N2$. Note that, although the integer value bias determining part 62 of the calculating part 60 may calculate the relative position $\Delta Ln$ of the navigation coordinate system from the relative position $\Delta Lb$ of the body coordinate system by acquiring the attitude angle in Formula 6 described above, the relative position $\Delta Ln$ of the navigation coordinate system obtained from the carrier phase difference may be used, without using the attitude angle.

Then, the relative positioning calculating part 63 of the calculating part 60 may calculate the FIX solutions of the particular position 200 using the integer value biases $\nabla\Delta N1$, $\nabla\Delta N2$, and the relative spatial relationship between the antennas 21 and 22 and the particular position 200 based on the attitude angle.

Thus, by using the configuration and the processing of this embodiment, the determination of the integer value biases can be accelerated, and the integer value biases can be determined securely and accurately. Particularly, in the configuration of this embodiment, even if the positioning location which needs the determination of the integer value biases differs from the position of the antenna, the determination of the integer value biases can be accelerated, and the integer value biases can be determined securely and accurately. That is, in the conventional case, the limitation of the integer value bias being an integer is required also for the calculation of the FLOAT solution. In this case, the attitude angle has to be calculated before the calculation of the FLOAT solution, and the calculation time of the FLOAT solution is delayed while waiting for the calculation of the attitude angle which takes time for the calculation, and, as a result, the determination time of the integer value biases becomes late. However, in the configuration and the processing of this embodiment, even if the attitude angle is not known when calculating the FLOAT solution, the FLOAT solution can still be calculated, thereby accelerating the calculation of the FLOAT solution and the determination of the integer value biases.

Note that in the above description processings of the determination of the integer value bias and the relative positioning calculation are executed by respective individual functional parts. However, each processing of the determination of the integer value biases and the relative positioning calculation may be programmed and stored, and the program may be read and executed by a processor. In this case, the processor may execute processing illustrated in each of the following flows each time the double phase difference is inputted.

Figure 3:
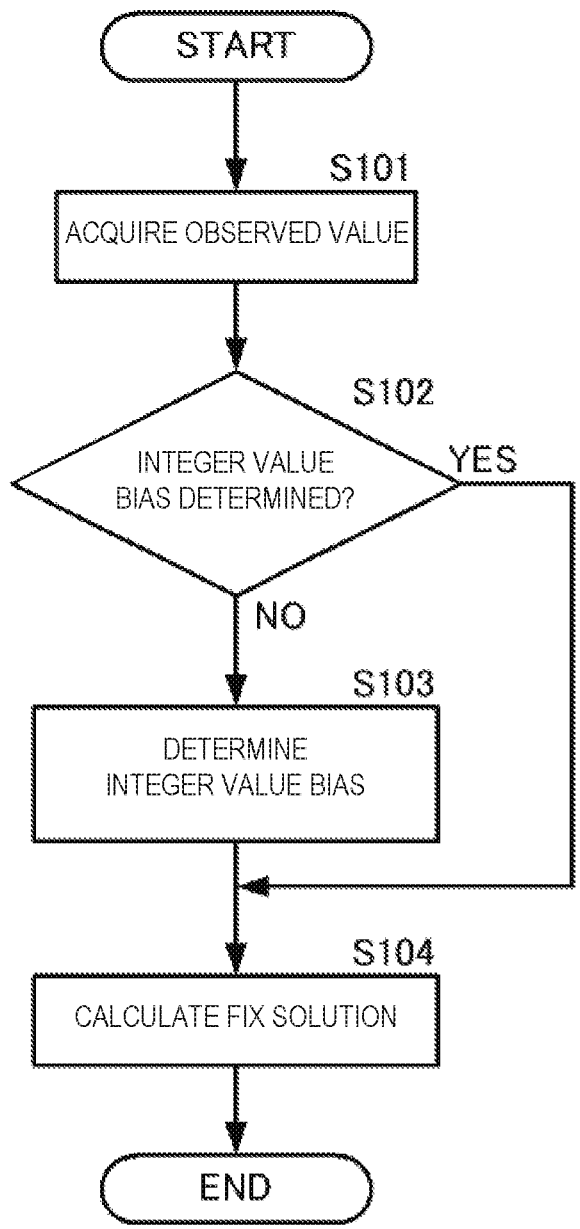
FIG. 3 is a flowchart illustrating processing of relative positioning according to the first embodiment of the present disclosure.

FIG. 3 is a flowchart illustrating the processing of the relative positioning according to the first embodiment of the present disclosure.

As illustrated in FIG. 3, the processor may first acquire an observed value, such as the double phase difference (S101). If the integer value biases have already been determined (S102: YES), the processor may calculate the relative positioning of the particular position 200 of the antenna device 20 (i.e., the FIX solution of the particular position 200) using the integer value biases (S104).

On the other hand, if the integer value biases have not determined (S102: NO) like the determination of the initial integer value biases, the processor may execute the determination of the integer value biases (S103). Then, the processor may calculate the FIX solution of the particular position 200 using the determined integer value biases (S104).

Figure 4:
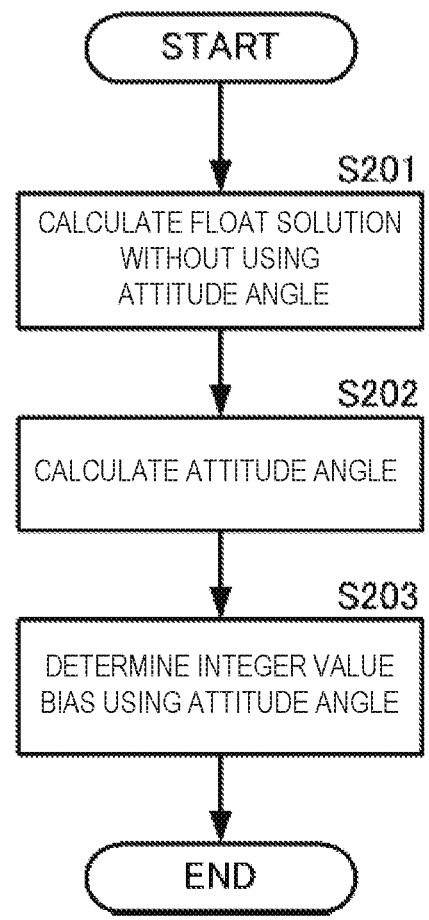
FIG. 4 is a flowchart illustrating determination of an integer value bias in the relative positioning according to the first embodiment of the present disclosure.

Next, the determination of the integer value biases of FIG. 3 is described. FIG. 4 is a flowchart illustrating the determination of the integer value biases in the relative positioning according to the first embodiment of the present disclosure.

As illustrated in FIG. 4, the processor may calculate the FLOAT solution, without using the attitude angle, as described above (S201). The processor may calculate the attitude angle (S202). The processor may determine the integer value bias using the attitude angle, as described above (S203). Note that, the processor may determine whether the attitude angle is valid, and if the attitude angle is valid, the processor may determine the integer value biases. The determination of whether the attitude angle is valid can be achieved by various kinds of known statistical verifications for the calculated attitude angle. If the attitude angle is not valid, the processor may not perform the determination of the integer value biases.

Figure 5:
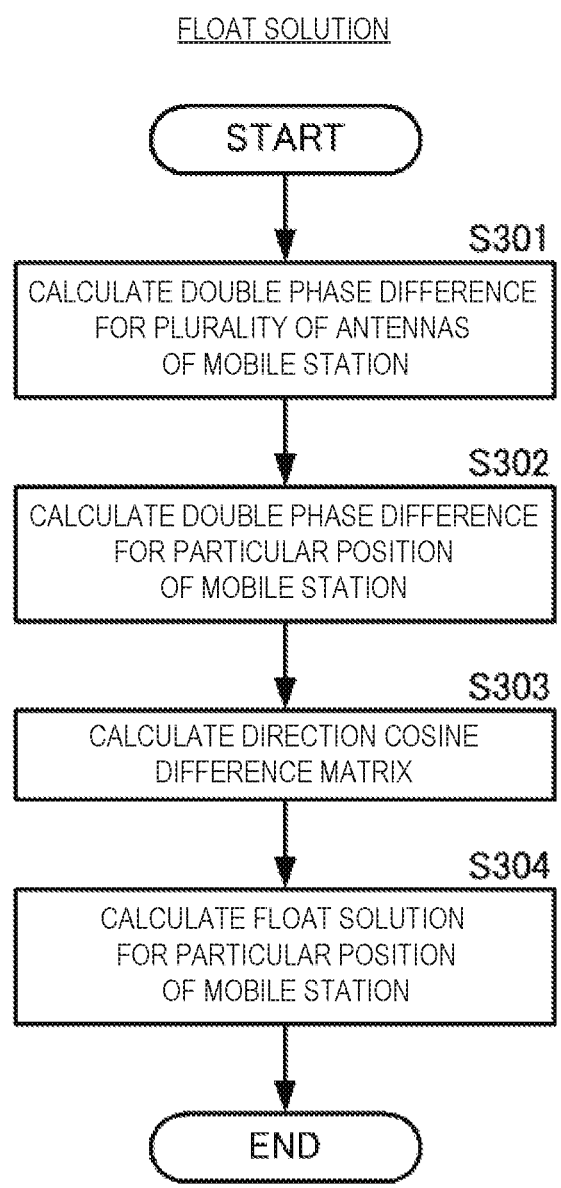
FIG. 5 is a flowchart illustrating calculation processing of a FLOAT solution in the relative positioning according to the first embodiment of the present disclosure.

Next, the calculation processing of the FLOAT solution of FIG. 4 is described. FIG. 5 is a flowchart illustrating the calculation processing of the FLOAT solution in the relative positioning according to the first embodiment of the present disclosure.

As illustrated in FIG. 5, the processor may calculate the double phase difference for the plurality of antennas 21 and 22 of the positioning device 10 (mobile station) (S301). Here, the double phase difference may mean the double phase difference between the antenna 90 of the reference station, and the antenna 21, and the double phase difference between the antenna 90 of the reference station, and the antenna 22.

The processor may calculate the double phase difference between the antenna 90 of the reference station, and the particular position 200 of the antenna device 20 of the mobile station by using the double phase differences (S302). Moreover, the processor may calculate the direction cosine difference matrix from the independent positioning results of the antennas 21 and 22, the position of the antenna 90, and the positions of the positioning satellites SV1 and SV2 (S303).

The processor may apply the Kalman filter to the equation which uses the double phase difference and the direction cosine difference matrix, as described above, and estimate the FLOAT solution for the particular position (S304).

Figure 6:
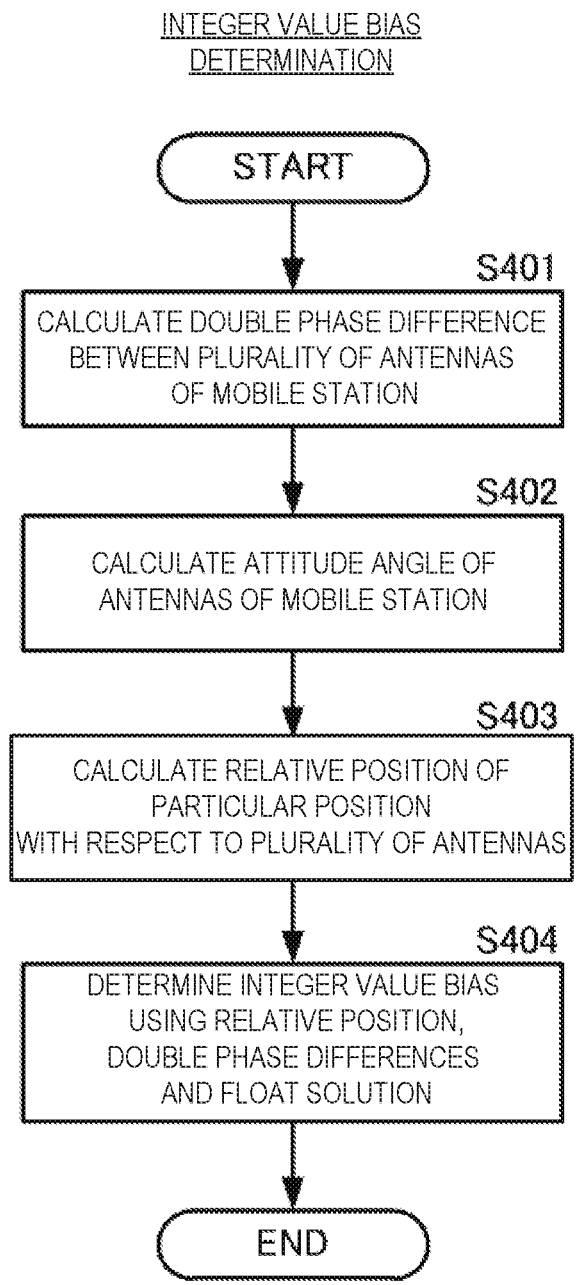
FIG. 6 is a flowchart illustrating determination of the integer value bias in the relative positioning according to the first embodiment of the present disclosure.

Next, more concrete processing of the determination of the integer value biases of FIG. 4 is described. FIG. 6 is a flowchart illustrating the determination of the integer value biases in the relative positioning according to the first embodiment of the present disclosure.

As illustrated in FIG. 6, the processor may calculate the double phase difference between the plurality of antennas 21 and 22 of the positioning device 10 (mobile station) (S401). Here, the double phase difference may mean the double phase difference between the antennas 21 and 22 on the basis of one of the antennas 21 and 22 of the mobile station, independent from the antenna 90 of the reference station.

The processor may calculate the attitude angle of the antennas 21 and 22 using the method described above (S402). The processor may calculate the relative position of the particular position 200 with respect to antennas 21 and 22 using the attitude angle (S403).

The processor may determine the integer value biases by applying the LAMBDA method to the above equation set using this relative position, the double phase difference between the antenna 90 of the reference station and the antenna 21 of the mobile station described above, the double phase difference between the antenna 90 of the reference station and the antenna 22 of the mobile station, and the FLOAT solution (S404).

Figure 7:
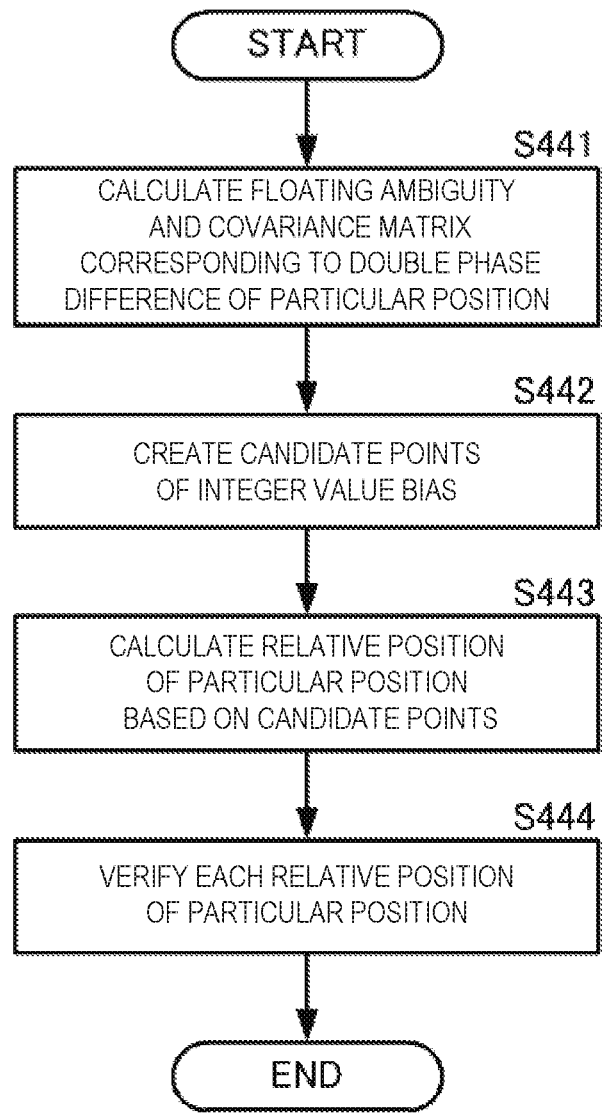
FIG. 7 is a flowchart illustrating more concrete processing of the determination of the integer value bias according to the first embodiment of the present disclosure.

This determination of the integer value biases may be performed by the following processing. FIG. 7 is a flowchart illustrating more concrete processing of the determination of the integer value biases according to the first embodiment of the present disclosure.

The processor may calculate the FLOAT solution and a covariance matrix of the integer value bias corresponding to the double phase difference of the particular position 200 (S441). The processor may create candidate points of the integer value bias by the LAMBDA method using the FLOAT solution and the covariance matrix of the integer value bias (S442).

The processor may calculate the relative position of the particular position 200 with respect to the antenna 90 based on each of the candidate points of integer value bias (S443). For example, the processor may calculate the relative position of the particular position 200 using the candidate point of the integer value bias which becomes the minimum norm.

The processor may perform a verification to each of the relative positions of the particular position 200 obtained from the respective candidate points (S444). As the verification, verification by the residual sum of squares or verification based on a ratio of the norm may be used, for example. The verification by the residual sum of squares may be to determine success or pass of the verification when the residual sum of squares is below a threshold value. The verification based on the norm ratio may be to determine success or pass of the verification when a ratio obtained by dividing the second smallest norm by the minimum norm is above a threshold value. Moreover, when performed a plurality of verifications and passed all the verifications, the processor may use the relative position of the particular position 200 corresponding to this candidate point.

Next, a relative positioning device, a relative positioning system, a relative positioning method, and a relative positioning program according to a second embodiment of the present disclosure are described with reference to the drawings.

In the relative positioning device, the relative positioning system, the relative positioning method, and the relative positioning program according to the second embodiment, the calculation result of the relative positioning is not outputted, if the FIX solution is not valid (i.e., not passed the verification). However, by using the method according to the second embodiment, it may become possible to output the FLOAT solution instead even if the FIX solution is not valid.

The configurations of the relative positioning device and the relative positioning system according to the second embodiment are similar to the configurations of the relative positioning device and the relative positioning system according to the first embodiment, and only differs in processing. Therefore, below, only the different processing from the first embodiment is described concretely.

Figure 8:
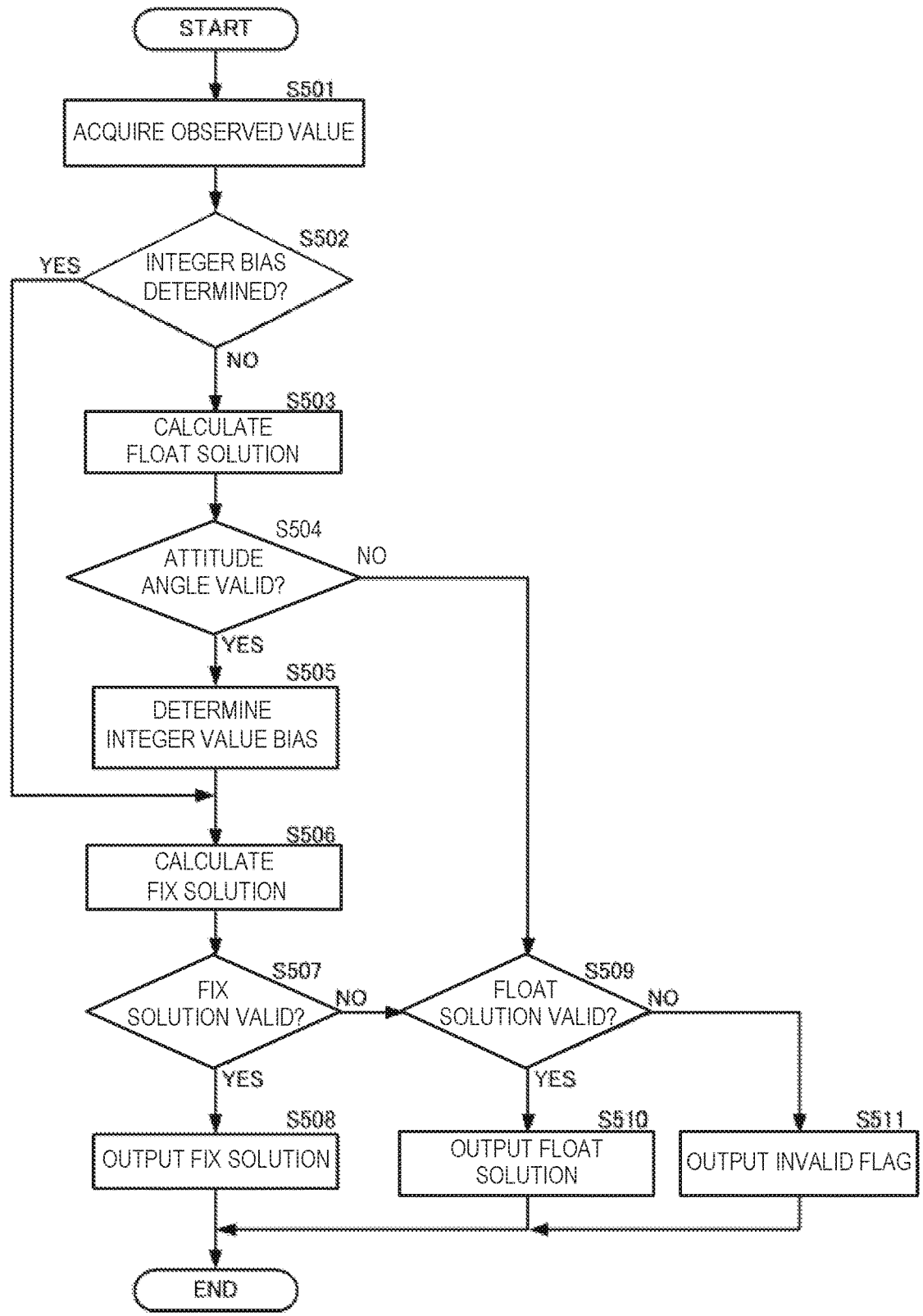
FIG. 8 is a flowchart illustrating processing of a relative positioning according to a second embodiment of the present disclosure.

FIG. 8 is a flowchart illustrating processing of relative positioning according to the second embodiment of the present disclosure.

As illustrated in FIG. 8, the processor may first acquire the observed value, such as the double phase difference (S501). If the integer value biases have already been determined (S502: YES), the processor may calculate the relative positioning of the particular position 200 of the antenna device 20 (i.e., the FIX solution of the particular position 200) using the integer value biases (S506).

If the integer value biases have not been determined like the determination of the initial integer value biases (S502: NO), the processor may calculate the FLOAT solution (S503).

The processor may acquire the attitude angle, and if the attitude angle is valid (S504: YES), it may then determine the integer value biases (S505). Then, the processor may calculate the FIX solution of the particular position 200 using the integer value biases (S506).

The processor may determine whether the FIX solution is valid using the verification described above (S507). If the FIX solution is valid (S507: YES), the processor may output the FIX solution (S508).

If the FIX solution is not valid (S507: NO), or if the attitude angle is not valid (S504: NO), the processor may determine the validity of the FLOAT solution (S509). If the FIX solution is not valid and the FLOAT solution is valid (S509: YES), the processor may output the FLOAT solution (S510). If the FLOAT solution is not valid (S509: NO), the processor may output an invalid flag which notifies the invalidity of the relative positioning result (S511).

By performing such processing, even when the FIX solution cannot be outputted, the FLOAT solution can be outputted according to the arrangement of the positioning satellites, the reception state of the positioning signals, etc., as long as the FLOAT solution is valid.

Figure 9:
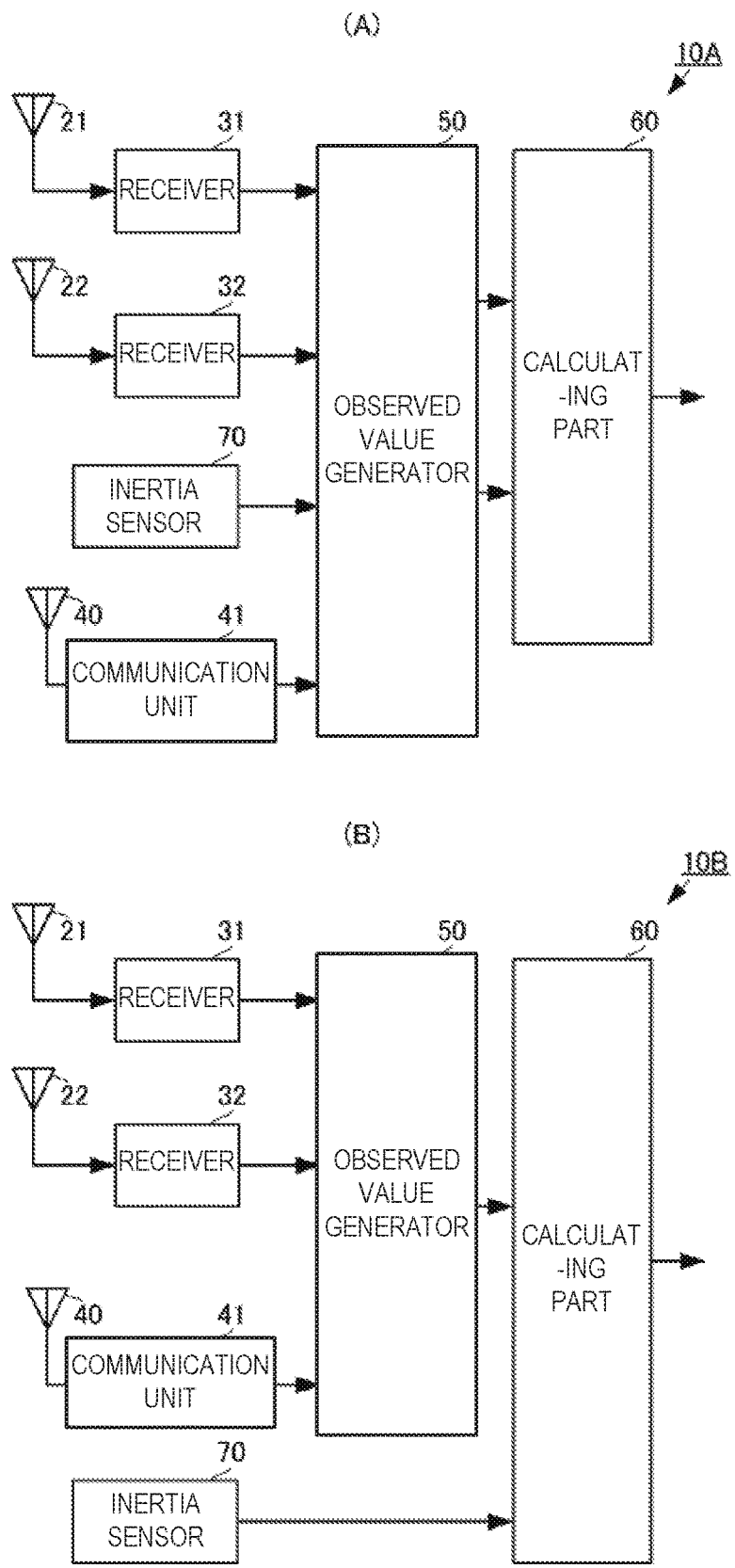
FIG. 9(A) is a functional block diagram of a first aspect of a relative positioning device according to a third embodiment of the present disclosure.
FIG. 9(B) is a functional block diagram of a second aspect of the relative positioning device according to the third embodiment of the present disclosure.

Next, a relative positioning device, a relative positioning system, a relative positioning method, and a relative positioning program according to a third embodiment of the present disclosure are described with reference to the drawings. FIG. 9(A) is a functional block diagram of a first aspect of the relative positioning device according to the third embodiment of the present disclosure. FIG. 9(B) is a functional block diagram of a second aspect of the relative positioning device according to the third embodiment of the present disclosure.

As illustrated in FIG. 9(A), positioning devices 10A and 10B according to the third embodiment differ in that an inertia sensor 70 is added to the positioning device 10 according to the first embodiment, and in that processing is changed accordingly. Other configurations of the positioning devices 10A and 10B are similar to those of the positioning device 10, and therefore, description of the same parts are omitted.

The inertia sensor 70 in FIGS. 9(A) and 9(B) may be provided with an angular velocity sensor, for example.

In the positioning device 10A of FIG. 9(A), the inertia sensor 70 may output an angular velocity to the observed value generator 50. The observed value generator 50 may calculate an integrated attitude angle using the angular velocity and the carrier phases of the positioning signals. The integrated attitude angle may be an attitude angle which is calculated by correcting the angular velocity of the inertia sensor 70 by the carrier phases or the angular velocity using the carrier phases, for example. The observed value generator 50 may output the attitude angle to the calculating part 60, and the calculating part 60 may perform the determination and the relative positioning of integer value biases using the attitude angle.

In the positioning device 10B of FIG. 9(B), the inertia sensor 70 may output the angular velocity to the calculating part 60. The calculating part 60 may calculate the attitude angle based on the angular velocity, and perform the determination and the relative positioning of the integer value biases using the attitude angle.

Thus, the attitude angle may be calculated using the output from the inertia sensor 70. In the positioning device 10A of FIG. 9(A), since a highly-precise attitude angle can be acquired, the accuracy of the determination of the integer value biases and the accuracy of the relative positioning can be further improved. Moreover, in the positioning device 10B of FIG. 9(B), since the attitude angle can be acquired at high speed, the transition to the integer value bias determination can be certainly made quicker.

Note that although the inertia sensor 70 is used, a geomagnetic sensor may be used instead of the inertia sensor 70.

Figure 10:
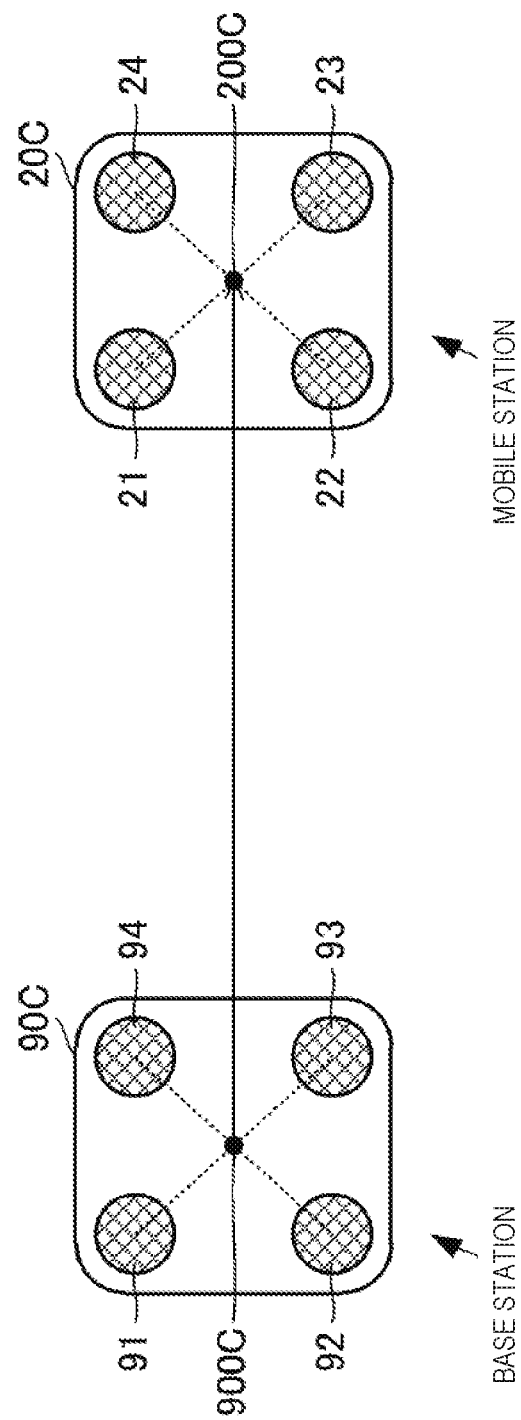
FIG. 10 is a view illustrating one example of another aspect for the layout of the antennas in the relative positioning system according to the embodiment of the present disclosure.

Note that although the number of antennas of the base station is one, and the number of antennas of the mobile station is two, the number of antennas of each station is not limited to these numbers. FIG. 10 is a view illustrating one example of another aspect for the layout of the antennas in the relative positioning system according to the embodiments of the present disclosure.

In FIG. 10, an antenna device 90C of the base station may be provided with four antennas 91, 92, 93, and 94. The antennas 91, 92, 93, and 94 may be disposed at four corners of a square when seen in a plan view of the antenna device 90C. An antenna device 20C of the mobile station may be provided with four antennas 21, 22, 23, and 24. The antennas 21, 22, 23, and 24 may be disposed at four corners of a square when seen in a plan view of the antenna device 20C.

In such a configuration, the relative positioning of a center point 200C of the antenna device 20C of the mobile station may be performed with respect to a center point 900C of the antenna device 90C of the base station. The center point 900C may be located at an equal distance from the antennas 91, 92, 93, and 94, and the position of the center point 900C can be defined by an average value of the position of antennas 91, 92, 93, and 94. Similarly, the center point 200C may be located at an equal distance from the antennas 21, 22, 23, and 24, and the position of the center point 200C can be defined by an average value of the position of antennas 21, 22, 23, and 24. Therefore, it is possible to apply the processing described above, and therefore, the FLOAT solution can be calculated without using the attitude angle, and the integer value biases can be determined using the FLOAT solution and the attitude angle. Thus, by increasing the number of antennas which receives the positioning signals, the number of observed values can be increased, thereby improving the determination accuracy of the integer value biases. Note that the number of antennas of the mobile station may not be the same as the number of antennas of the base station. Moreover, the point (reference point) used as the starting point and the terminal point of the base-line vector which determines the integer value bias may not be the center point of the layout of the plurality of antennas. In this case, the reference point may be defined by a weighted average of the positions of the plurality of antennas.

Figure 11:
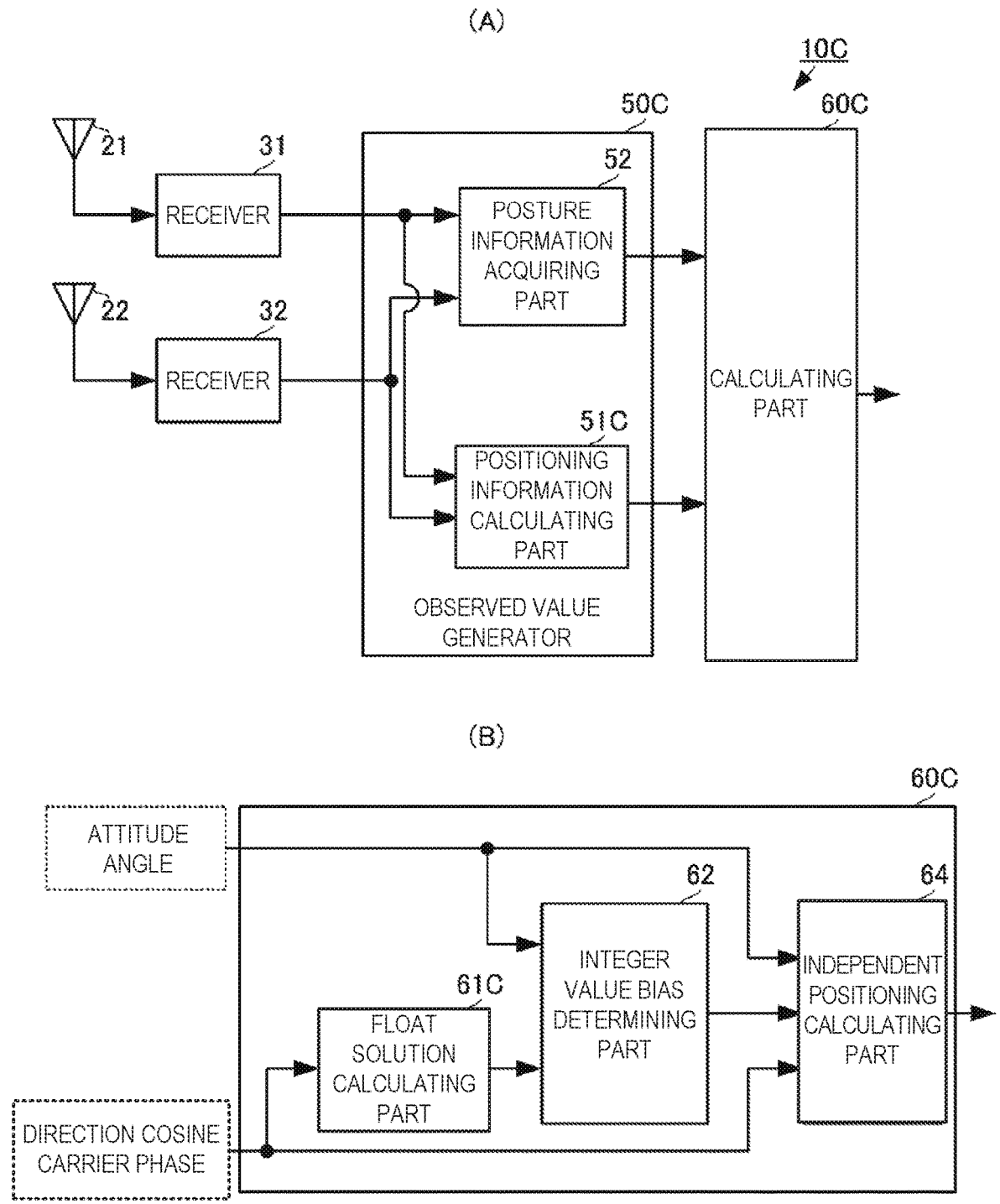
FIG. 11(A) is a functional block diagram of the relative positioning device according to the third embodiment of the present disclosure.
FIG. 11(B) is a functional block diagram of a calculating part illustrated in FIG. 11(A).

Next, the positioning device, the positioning method, and the positioning program according to the third embodiment of the present disclosure are described with reference to the drawings. FIG. 11(A) is a functional block diagram of the relative positioning device according to the third embodiment of the present disclosure, and FIG. 11(B) is a functional block diagram of a calculating part illustrated in FIG. 11(A).

In the first and second embodiments described above, RTK which uses the difference of the carrier phase of the base station and the carrier phase of the mobile station (carrier phase difference) is described. However, the above processing may also be applicable to PPP (Precision Point Positioning) only using the carrier phase of the mobile station. When PPP is used, the configuration illustrated in FIGS. 11(A) and 11(B) may be applicable. Note that, in the configuration illustrated in FIGS. 11(A) and 11(B), the same reference characters as those in FIGS. 1(A) and 1(B) are given to the same parts as FIGS. 1(A) and 1(B), and therefore, description of the parts is omitted.

As illustrated in FIG. 11(A), a positioning device 10C may include the positioning antennas 21 and 22, the receivers 31 and 32, an observed value generator 50C, and a calculating part 60C (which is also referred to as processing circuitry). The observed value generator 50C may include a positioning information calculating part 51C and the posture information acquiring part 52. As illustrated in FIG. 11(B), the calculating part 60C may include a FLOAT solution calculating part 61C, the integer value bias determining part 62, and an independent positioning calculating part 64. The receivers 31 and 32, the communication unit 41, the observed value generator 50C, and the calculating part 60C may be respectively implemented by individual hardware or sole hardware, and a processing program for each part executed by the hardware.

The positioning information calculating part 51C may calculate carrier phases and direction cosines of the antennas 21 and 22. The positioning information calculating part 51C may output the carrier phases and direction cosines to the calculating part 60C.

The FLOAT solution calculating part 61C may calculate a FLOAT solution of independent positioning at a particular position 200 (see the mobile station in FIG. 2) different from the antennas 21 and 22, by using the carrier phases and the direction cosines. Here, the FLOAT solution calculating part 61C may calculate the FLOAT solution of the independent positioning by processing in which the carrier phase difference and the direction cosine difference in the first embodiment are replaced by the carrier phases and the direction cosines.

The integer value bias determining part 62 may determine an integer value bias using the FLOAT solution and the attitude angle. The independent positioning calculating part 64 may calculate a FIX solution of the particular position 200 using the integer value bias, and a relative spatial relationship between the antennas 21 and 22, and the particular position 200 based on the attitude angle.

By such a configuration, the estimation of the FLOAT solution of the integer value bias may become high speed in the independent positioning using the carrier phases.

Note that the processing used for the independent positioning of this embodiment can be achieved by replacing the carrier phase difference in the processing illustrated in the first embodiment by the carrier phase, and replacing the direction cosine difference by the direction cosine.

DESCRIPTION OF REFERENCE CHARACTERS 10, 10A, 10B, 10C: Positioning Device
20, 20C: Antenna Device
21, 22: Antenna
90: Antenna
31, 32: Receiver
40: Antenna
41: Communication Unit
50, 50C: Observed Value Generator
60, 60C: Calculating Part
61, 61C: FLOAT Solution Calculating Part
62: Integer Value Bias Determining Part
63: Relative Positioning Calculating Part
64: Independent Positioning Calculating Part
70: Inertia Sensor
90: Antenna
90C: Antenna Device
91: Antenna
200: Particular Position
200C: Center Point
900, 900C: Center Point
bb0: Base-line Vector
bb01: Base-line Vector
bb02: Base-line Vector
SV1: Positioning Satellite
SV2: Positioning Satellite

What is claimed is:

1. A positioning device, comprising:
processing circuitry configured to:
use carrier phase differences between carrier phases obtained by a plurality of antennas of a first station and a carrier phase obtained by one or more antennas of a second station provided separately from the first station to calculate a FLOAT solution of a particular position that is a relative position with respect to the second station, without using posture information on the first station;
acquire the posture information on the first station; and
determine an integer value bias of the carrier phase differences, using the FLOAT solution of the particular position and the posture information on the first station.

2. The positioning device of claim 1, wherein the processing circuitry is further configured to calculate a FIX solution of the particular position, using the FLOAT solution of the particular position and the integer value bias.

3. The positioning device of claim 1, wherein the first station includes:
the processing circuitry configured to;
acquire second station data including the carrier phases obtained at the second station;
calculate the FLOAT solution; and
determine the integer value bias.

4. The positioning device of claim 1, wherein a plurality of antennas are disposed at the second station, and
wherein the processing circuitry is further configured to calculate the FLOAT solution, using carrier phase differences between the carrier phases respectively obtained by the plurality of antennas of the second station, and the carrier phases respectively obtained by the plurality of antennas of the first station.

5. The positioning device of claim 1, wherein the processing circuitry is further configured to calculate the posture information, using the carrier phases of the plurality of antennas obtained at the first station, an output of an inertia sensor disposed at the first station, or a geomagnetic sensor disposed at the first station.

6. The positioning device of claim 1, wherein the processing circuitry is further configured to calculate a FLOAT solution of the integer value bias, as well as the particular position of the first station.

7. The positioning device of claim 1, wherein the particular position of the first station is a position different from positions of the plurality of antennas of the first station, and is a position calculated by a weighted average of the positions of the plurality of antennas of the first station.

8. A positioning system, comprising the configuration of the positioning device of claim 1,
wherein the first station is a mobile station, and the second station is a reference station.

9. A positioning method, comprising the steps of:
using carrier phase differences between carrier phases obtained by a plurality of antennas of a first station and a carrier phase obtained by one or more antennas of a second station provided separately from the first station to calculate a FLOAT solution of a particular position that is a relative position with respect to the second station, without using posture information on the first station;
acquiring the posture information on the first station; and
determining an integer value bias of the carrier phase differences, using the FLOAT solution of the particular position and the posture information on the first station.

10. A non-transitory computer-readable recording medium storing a control program causing a processor of a positioning device to execute processing, the processor configured to control operation of the device, the processing comprising:
using carrier phase differences between carrier phases obtained by a plurality of antennas of a first station and a carrier phase obtained by one or more antennas of a second station provided separately from the first station to calculate a FLOAT solution of a particular position that is a relative position with respect to the second station, without using posture information on the first station;
acquiring the posture information on the first station; and
determining an integer value bias of the carrier phase differences, using the FLOAT solution of the particular position and the posture information on the first station.

* * * * *